June 17, 1958     K. HINRICHS     2,838,993
SELECTIVE PRINTER RESPONSIVE TO SOUND TRACK ON RECORD CARD
Filed Nov. 1, 1955     2 Sheets-Sheet 1

Inventor:
Kurt Hinrichs
By: Michael S. Struker
agt

Fig. 4

Inventor:
Kurt Hinrichs
By: Michael S. Striker
agt.

United States Patent Office 2,838,993
Patented June 17, 1958

2,838,993
SELECTIVE PRINTER RESPONSIVE TO SOUND TRACK ON RECORD CARD

Kurt Hinrichs, Oldenburg, Germany, assignor to Exacta Buromaschinen G. m. b. H. Köln, Koln-Deutz, Germany Application November 1, 1955, Serial No. 544,285

Claims priority, application Germany November 2, 1954

20 Claims. (Cl. 101—93)

The present invention relates to a new and improved bookkeeping machine arrangement. More particularly the present invention relates to a new and improved bookkeeping machine arrangement wherein the printing mechanism of the bookkeeping machine is automatically operated by the account card which is inserted in the machine.

In convenional bookkeeping machines, in use today, the entries to be made on the account cards inserted in the bookkeeping machine are manually operated. That is, when a new entry is made on an account card, the keys of the machine corresponding to the previous balance are manually operated and the multi-order number corresponding to the previous balance is printed on the account card in a particular tabular column. The new entry is then printed in its respective tabular column, for example, a credit or a debit, by manually pressing keys corresponding to the digits of the new multi-order number entry. The bookkeeping machine then carries out the necessary computation so that the new entry is either added or subtracted to the previous balance and the resultant new balance is automatically printed in its respective tabular column.

Accordingly, after all the entries are made on the account card, it is advisable and necessary to inspect the various entries to see whether any error has been made in the operation of the keys of the bookkeeping machine. It is clear that the required key operation for making the various entries provides a time delay and in addition gives no assurance that the entries are correct. Therefore, additional time loss is incurred when the entries on the account cards are checked for errors.

It is also necessary in conventional bookkeeping machines to accurately position the vertical height of the account card in the bookkeeping machine so that the entry will be made both in its proper tabular column as well as at its proper vertical height. To accomplish this in conventional bookkeeping machines, very complicated devices are required. Such complicated devices are often subject to variations which alter the position of the card in the machine so that the entry is not made at the proper vertical height.

The present invention overcomes these disadvantages by providing an account card having sound tracks thereon and electronic means responsive to the sound tracks for automatically operating the printing mechanism of the bookkeeping machine and for automatically positioning the vertical height of the card in the machine.

It is accordingly an object of the present invention to overcome the disadvantages of conventional bookkeeping machines.

A second object of the present invention is to provide a new and improved bookkeeping machine arrangement.

A further object of the present invention is to provide a new and improved bookkeeping machine arrangement using electronic apparatus for automatically making entries on the account card.

Still a further object of the present invention is to provide an account card for use with bookkeeping machines, which account card has at least one sound track mounted thereon.

Another object of the present invention is to provide a new and improved bookkeeping machine arrangement wherein the old balance is automatically printed on the account card and the newly arrived balance is automatically recorded on a sound track on the account card.

Still another object of the present invention is to provide a new and improved bookkeeping machine arrangement operated by an account card having at least one sound track with recordings thereon corresponding to the various characters to be printed on the account card.

With the above objects in view the present invention mainly consists of a bookkeeping machine arrangement using cards having, on a sound track, recordings selected from a set of characteristic recordings respectively associated with different characters, and including pickup means for successively sensing each recording on the sound track of the card and for producing a voltage signal having a predetermined characteristic associated with the respective sensed recording, marking means movable between a plurality of positions and adapted to mark on the card in each of the positions one of the different characters, means connected to the pickup means and being selectively responsive to voltage signals produced by the same, and operating means controlled by the selectively responsive means and connected to the marking means for moving the same between its positions in accordance with the predetermined characteristics of the responsive voltage signals whereby a character is marked on the card corresponding to the recording on the sound track sensed by the pickup means.

Another feature of the present invention is to provide erasing means which erase the recordings made on the sound track after they have been sensed by the pickup means.

In another embodiment of the present invention, the arrangement includes recording means for automatically recording a new set of recordings on the sound track of the account card before the card leaves the bookkeeping machine.

Another feature of the present invention is a plurality of tuned circuits which are respectively tuned to the different frequencies of the recordings made on the sound tracks of the account card.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
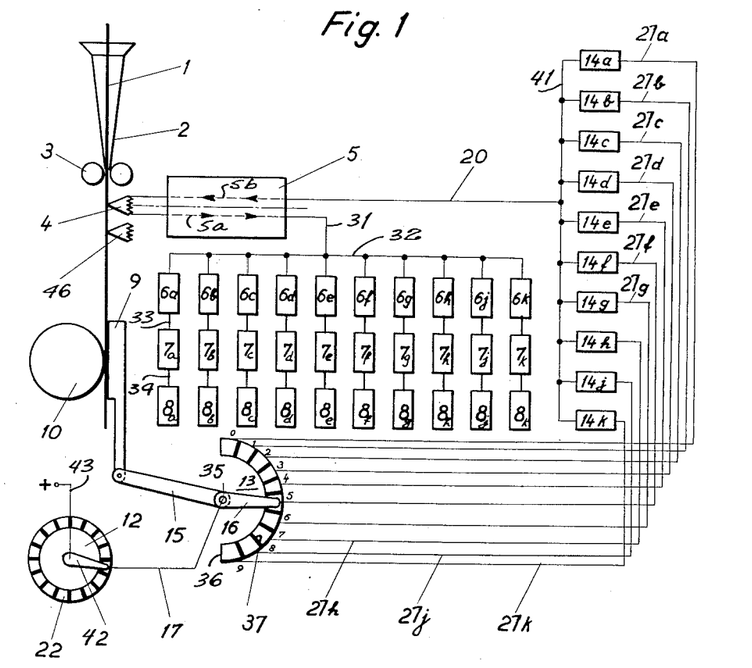
Fig. 1 is a partial side view of the apparatus showing the electronic apparatus in diagrammatic block form.
Figure 4:
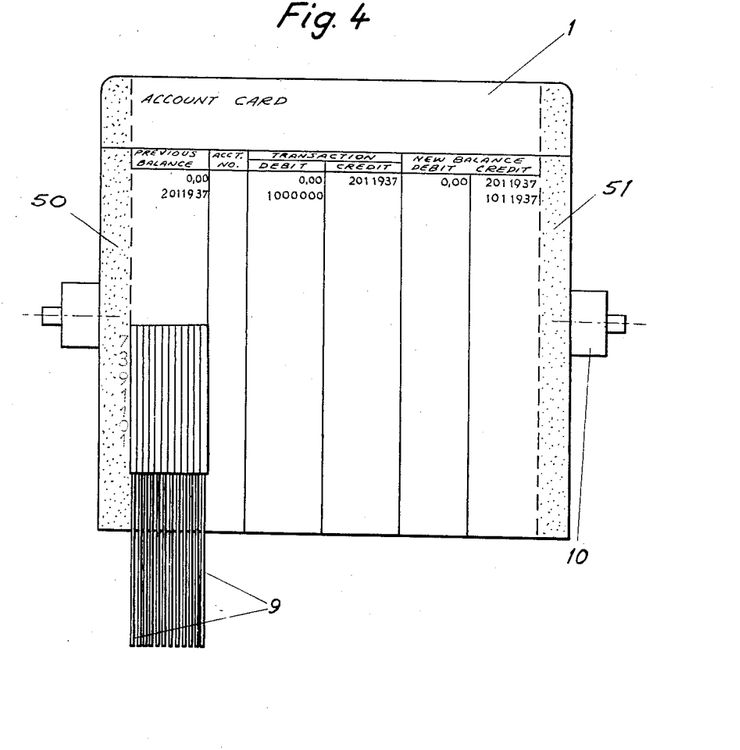
Fig. 4 is a front view of the account card and roller of the bookkeeping machine showing the relationship thereof to the printing members of the machine.

Referring to the drawings and more particularly to Figs. 1 and 4, it can be seen that the account card 1 is inserted through a card chute 2 and moved by driving drums 3 past a pickup or recorder head 4 to a position between the roller 10 of the bookkeeping machine and the printing members 9 thereof.

The pickup head 4 is connected to an amplifier 5 having an output channel 5a and an input channel 5b. The output channel 5a of the amplifier 5 is connected by means of a conductor 31 to a common conductor 32. The common conductor 32 is connected in turn to the input of a plurality of frequency tuned circuits 6a—6k. In the embodiment illustrated in Fig. 1 there are ten tuned circuits 6 provided. Each of the tuned circuits 6 is connected respectively to the input of a respective electronic relay 7. That is, the output of the frequency tuned circuits 6a is connected by a conductor 33 to the input of the electronic relay 7a.

In turn the outputs of the electronic relay 7a is connected by a conductor 34 to a magnetic member 8a. Each of the electronic relays 7b—7k is similarly connected respectively to a magnetic member 8. The magnetic member 8 may be a solenoid which is energized by the operation of its respective relay. The magnetic member 8 is connected mechanically (by means not shown) to the printing member 9 of the bookkeeping machine.

When the machine is used for bookkeeping purposes it is apparent that the entries to be made on the account card should be various digits of a multi-order number. Therefore, the face of the typing member 9 that is towards the roller 10 has a plurality of digits 0–9 stamped or otherwise mounted thereon. It is clear that the printing member 9 will make contact with the account card 1 only at that point where the member 9 is tangent to the roller 10. The printing member 9 is vertically displaceable so that any one of the digits 0–9 thereon may be placed just tangent to the roller 10. Accordingly, if the roller 10 is brought towards the member 9 or vice versa the particular digit that is positioned tangent to the roller 10 at the time will be printed on the account card.

Connected to the lower end of the printing member 9 is a lever 15 which is connected at its other end to a wiper 16 of a stepping switch 13. The wiper 16 is rotatable about a fixed point 35 at one of its ends and makes contact with the plurality of contacts of the switch 13 at its other end. The arcuate portion 36 of the switch 13 is divided into a plurality of contacts by insulating strips 37.

In the embodiment of Fig. 1 the arcuate fixed portion of the stepping switch 13 is shown divided into ten electrically conductive sectors, each sector corresponding to one of the digits 0–9. The sector corresponding to the digit 0 is connected by a conductor 27a to a frequency generator 14a. Similarly each of the sectors corresponding to the other digits is connected on its respective conductor 27 to its respective frequency generator 14. That is, for example, the sector corresponding to the digit 9 is connected on conductor 27k to the frequency generator 14k. The output of each of the frequency generators 14k is connected to a common conductor 41 which in turn is connected to a conductor 20. The conductor 20 is connected to the input channel 5b of the amplifier 5 and from there back to the pickup and recording head 4.

The remaining connections to the switch 13 include a conductor 17 connected to the wiper 16. The other end of the conductor 17 is connected to a sector 22 of a second switch 12. The switch 12 has a wiper 42 which is rotatable about one of its ends and makes contact with a plurality of electrically conductive sectors 22 mounted on the fixed annular portion of the switch 12. The wiper 42 is also connected to the positive terminal of a source of operating potential by means of a conductor 43. This source of potential is not shown but rather is indicated by the plus sign. The switch 12 is mechanically connected to the roller 10 so that its wiper 42 rotates with the rotation of the roller 10. However, the mechanical connection (not shown) between the roller 10 and the switch 12 is such that the wiper 42 will only rotate when the roller 10 turns in one particular direction. It can also be arranged so that the wiper 42 and the switch 12 will rotate only once at some predetermined portion of the rotation of the roller 10.

Referring to Fig. 4 the account card is shown having a plurality of tabular columns on its front face. Arranged along the left hand edge portion of the account card 1 is a sound track 59. At the right hand edge portion of the account card 1 is a second sound track 51. Arranged in front of the account card and shown positioned at the left hand tabular column are twelve printing members 9. Accordingly, it can be seen that a twelve digit multi-order number can be printed in the left hand tabular column by the printing members 9. This multi-order number can be simultaneously produced or may be printed one digit at a time.

In operation the account card 1 is inserted into the bookkeeping machine through the card chute 2 and transported by the driving rollers 3 past the pickup and recording head 4 to a position between the roller 10 and the printing members 9. If there are any recordings on the sound track 50, these recordings will be sensed by the pickup head 4 and converted to voltage signals having a characteristic which is predetermined for the particular recordings. That is, each recording made on the sound track for a particular digit is always made at a particular frequency. Therefore for the ten different digits there are ten different frequencies available.

Accordingly each recording sensed by the pickup head 4 will be converted into a voltage signal having a particular frequency corresponding to the digit which the recording represents. This voltage signal is amplified in the output channel 5a of the amplifier 5 and is applied by means of the conductor 31 to the common conductor 32. From the common conductor 32 the voltage signal having the predetermined frequency is applied to the input of all ten of the frequency tuned circuits 6. Each of the frequency tuned circuits is arranged so that it will transmit therethrough only one predetermined frequency, which frequency corresponds to the particular digit for which the tuned circuit 6 is provided. For example, the tuned circuit 6a is tuned to a frequency which corresponds to the frequency for the digit 0. Therefore, the only voltage signal that will be transmitted through the tuned circuit 6a will be that voltage signal having a frequency which is equivalent to the frequency corresponding to the digit 0.

Accordingly, if the recording sensed by the pickup head 4 corresponds to the frequency for the digit 0, the voltage signal will be transmitted through the tuned circuit 6a and applied on conductor 33 to the electronic relay 7a. Simultaneously, this voltage signal will be blocked by all of the remaining tuned circuits 6b—6k. It is apparent that these other frequency tuned circuits cannot be tuned to the frequency corresponding to the digit 0.

The signal applied to the electronic relay 7a energizes this relay causing it to attract its armature and complete the circuit of the magnet means 8a. This will energize the magnet means 8a, which may be a solenoid, for example, and cause the same to move the printing member 9 to which it is connected to a vertical position corresponding to the digit 0. That is, the digit 0 on the printing member 9 will be vertically displaced so that it will appear at the tangential point of the roller 10. Therefore, this printing member 9 will be in a position to print the digit 0 on the account card 1 when the printing operation takes place.

Similarly, when the next recording on the sound track is sensed by the pickup head 4, a second voltage signal will be derived which will have a frequency corresponding to the particular digit to be printed in the next order. This voltage signal will be transmitted through the corresponding tuned circuit and operate the respective relay and magnet means to position the next typing member 9 in its proper digital position. That is, if the next digit to be printed is the digit 6, the voltage signal will be transmitted through the tuned circuit 6f and will operate the relay 7f and magnetic means 8f. The magnetic means 8f will position the printing member for the next order so that the digit 6 on this printing member will be arranged at the tangential point of the roller 10.

After each of the printing members 9 for each order has been properly vertically displaced so that the respective digits opposite the tangential point of the roller 10 are properly aligned in accordance with the recordings on the sound track of the account card, the typing members 9 may all be pressed against the account card or the roller 10 may press the account card against the typing members 9. The method and apparatus whereby the actual printing takes place and whereby the actual inking of the printing members and the provision of pressure therefor forms no part of the present invention and accordingly is not illustrated. It is apparent that once the printing members 9 have been properly positioned with respect to the roller 10 in accordance with the present invention, they may be activated to print the required multi-order number in its proper tabular column in accordance with conventional apparatus.

Once the multi-order number corresponding to the recordings on the sound track 50 has been printed on the account card in its tabular order, the account card and the roller 10 are shifted with respect to the printing members so that the printing members will print the next multi-order number in its respective tabular column. This shifting, of course, is also done by conventional methods. The printing members 9 are then properly positioned to print the next entry on the account card. This is done by conventional means wherein keys corresponding to the proper digits in the proper order are manually operated to vertically displace the respective printing members 9 and place the same in the position to print the proper digit in its proper order. This multi-order number is then printed in its proper tabular column and the computing portion of the bookkeeping machine is activated in the conventional manner so that the new balance which may correspond to the sum or difference between the previous two entries is printed in the last tabular column. If no further entries are to be made on the account card, the account card is then removed from the bookkeeping machine. However, in accordance with another feature of the present invention the new balance which has last been printed on the account card, will be recorded on the sound track 50 as the account card leaves the bookkeeping machine.

This last recording is done in the following manner. Arranged beneath the pickup and recording head 4 in Fig. 1 is shown a second head 46 which is an erasing head. The function of the erasing head 46 is to remove the recording on the sound track 50 after this recording has been sensed by the pickup head 4. Therefore, after the account card has been fully inserted into the bookkeeping machine, the sound track 50 will no longer have any recordings thereon.

When the last number has been printed by the bookkeeping machine, the vertical displacement of each of the printing members 9 has caused a corresponding rotation of the lever 15 connected thereto. Similarly connected to the rotated lever 15 is a wiper 16 which has also been rotated a corresponding amount. That is, there is one stepping switch 13 for each of the printing members 9. The vertical displacement of the respective member 9 causes a corresponding positioning of the wiper 16 of its respective switch 13. Therefore, if the particular printing member 9 is in a position to print the digit 5, for example, its corresponding wiper 16 will be connected to the sector 36 of the switch 13 corresponding to the digit 5. This position of the wiper 16 is illustrated in Fig. 1. As indicated the wiper 16 is connected by a conductor 17 to a particular sector 22 of the second switch 12. At some predetermined position of the account card as it is being withdrawn from the bookkeeping machine, the switch 12 will be activated by the roller 10 through the mechanical gearing therebetween. The wiper 42 will then make contact with the successive electrically conductive sectors 22 on the annular fixed portion of the switch 12. As each sector 22 is contacted by the wiper 42 it will apply the positive potential by means of the conductor 43 thereto.

As this contact is made with each sector, the positive potential will be applied from the sector 22 through its corresponding conductor 17, the wiper 16 of the respective switch 13 and the respective conductor 27 to the respective frequency generator 14. That is, when the wiper 42 of the switch 12 makes electrical contact with the sector 22 corresponding to an order for which the digit 5 has been printed, the positive potential will be applied through the switches 12 and 13 to the conductor 27e. This will apply the positive potential to the frequency generator 14e. This will cause the frequency generator to emit a predetermined frequency corresponding to the digit 5. This frequency will be applied through the common conductor 41 and the conductor 20 to the output channel 5b of the amplifier 5 to the pickup and recording head 4. Since the action of the switch 12 is synchronized with the action of the roller 10, the pickup and recording head 4 will record the digit 5 at some predetermined position on the sound track 50 of the account card depending on the order in which the digit 5 appears. That is, if the digit 5 appeared in the tens order, the frequency corresponding to the digit 5 will be recorded on the sound track 50 in a position thereof corresponding to the tens order as the account card is emitted from the bookkeeping machine. Therefore, when the account card has been completely emitted from the machine it will have printed in its proper tabular columns, the various entries and will also have recorded on the sound track 50 a plurality of frequencies which have been successively recorded and which correspond to the last multi-order number printed by the printing members 9.

The advantages of the above-described arrangement can most clearly be seen in the carrying out of an illustrative example. Referring to Fig. 4, a new account card, not having any entries thereon will also have a sound track 50 upon which no recordings appear. This account card 1 is inserted into the bookkeeping machine. The vertical height of the account card is automatically adjusted in the machine by means to be described in greater detail hereinbelow. Since there have been no previous entries on the account card, the previous balance is 0 and the first transaction is entered on the account card by manually operating the keys of the bookkeeping machine. In the illustrative example a credit of 2,011,937 is entered in the credit column of the bookkeeping machine by means which form no part of the present invention. It is clear that these means are available in every conventional bookkeeping machine.

The computing apparatus in the bookkeeping machine, which is also conventional, is then operated and since only the credit entry appears, the new balance will be derived and will be a credit of 2,011,937. This entry is again automatically printed in its proper tabular column on the account card as shown. However, the printing members 9 which have been operated to print this balance have each respectively displaced the wiper of the switch 13 connected thereto so that this wiper is now connected to a contact area of the switch 13 which corresponds to the proper digit. For example, the printing member 9 which printed the tens order will have printed the 3 and accordingly it will have displaced its respective wiper 16 so that it makes contact with the area of the switch 13 corresponding to the digit 3. Similarly, each of the other printing members have so displaced their respective switches so that in the hundreds order the switch will make contact with the digit 9, the thousands order with the digit 1, etc.

As the account card is emitted from the machine, at some predetermined point of the emission thereof the mechanical gearing between the roller 10 and the switch 12 will become effective so that the wiper 42 of the switch 12 will start to make contact successively with each of the contacts 22 of the switch 12. If the switch 12 is so arranged that the first contact 22 corresponds to the units order 7, for example, the positive potential on the conductor 43 will be applied through the units order contact 22, the respective conductor 17, wiper 16, contact area corresponding to digit 7, conductor 27g to frequency generator 14g. The frequency generator 14g will be switched in to emit on the conductor 20 a frequency which corresponds to the digit 7. This frequency is amplified in the output channel 5b of the amplifier 5 and applied to the pickup and recording head 4 where the frequency is recorded on the sound track 50 which is now passing by the head 4.

Accordingly by the action of the present invention the frequency corresponding to the digit 7 will be recorded on the position of the sound track 50 which corresponds to the units order.

It is clear that the angular extent of each of the contact areas 22 is long enough to permit a sufficient signal to be applied for each digit. Therefore, when the wiper 42 of the switch 12 makes contact with the next contact area 22, this corresponds to the tens order, or to the digit 3. Therefore, the positive potential will be applied to the switches 12 and 13 and the conductor 27c to the frequency generator 14c. This will result in a frequency being recorded in the next position on the sound track 50, which frequency corresponds to the digit 3.

As the account card is emitted from the bookkeeping machine the remaining frequencies will be recorded on theh sound track 50, with each digit being recorded in the order in which it appears in the new balance, last printed on the account card. This account card can now be filed in the usual manner. It is apparent that the sound track 50 may be a magnetic material or tape which can either be pasted or sprayed onto the front or rear face of the account card 1. Accordingly it will not take up any additional space and will not intefere with the regular handling of these account cards.

When the time comes for the next entry to be made on the account card, the account card 1 is again inserted into the bookkeeping machine. This time, since there is a previous balance of 2,011,937, the insertion of the account card into the bookkeeping machine will cause the balance to be printed in its proper tabular column. That is, the sound track 50 will pass adjacent the pickup and recording head 4 as the account card is inserted into the machine. The head 4 will sense each recording successively as the sound track passes thereby. Accordingly, it will pickup the first recording and convert the same to a voltage signal having a frequency corresponding to the recorded frequency. Since this frequency has been recorded by one of the frequency generators 14, this frequency will correspond to one of the frequencies to which the frequency tuned circuits 6 are tuned. Accordingly, when the voltage signal is amplified in the input channel 5a and applied to the common conductor 32 the amplified voltage signal will be able to pass through only one of the ten tuned circuits. If this first signal corresponds to the millions order, it will have a frequency thereon corresponding to the digit 2 and accordingly the frequency tuned circuit 6b will be tuned to this applied voltage signal. This will permit the applied voltage signal to pass through the tuned circuit 6b and energize the relay 7b. This will activate the magnetic member 8b which in turn will vertically displace the printing member 9 in the millions order to the position whereby the digit 2 on the printing member corresponds to the tangential point of the roller 10.

Similarly, as each of the recorded frequencies is sensed by the pickup and recording head 4, this head will convert the recorded frequency into the voltage signal which will be amplified by the amplifier channel 5a and applied to the common conductor 32. Each of these voltage signals will have frequencies corresponding to the digits which they are supposed to represent. Each of these voltage signals will be permitted to pass through, respectively, only one of the ten frequency tuned circuits 6a—6k. It will accordingly operate the respective magnetic member 8 which will move the printing member of the proper order to its proper digital printing position.

Each of the printing members 9 can be pressed onto the account card 1 in a conventional manner after it has been properly positioned, or else all of the members 9 can be pressed onto the account card at one time. Similarly, the roller 10 can press the account card toward the printing member 9 to carry out the same purpose.

The result of the above operation is that the previous balance has been automatically printed on the account card in its proper tabular column and at its proper vertical height. This number is automatically entered in the computing portion of the bookkeeping machine in the conventional manner. Therefore, it is not necessary to check this new entry in the left hand tabular column to the old entry in the right hand tabular column. This entry must be correct since the recordings have been made from the printing members which have entered the old entry.

Therefore all that the operator now has to do is to manually operate the keys which correspond to the new entry. In the illustrative example, a new entry of 1,000,000 is to be made in the transaction column on the debit side. Therefore, the proper keys are depressed on the bookkeeping machine to have this entry made on the account card in the conventional manner. This entry is also properly registered in the computer portion of the bookkeeping machine so that when the operator operates the computer key, the bookkeeping machine will automatically subtract 1,000,000 from 2,011,937. The bookkeeping machine will then automatically print the difference 1,011,937 in the tabular column corresponding to the new balance.

It should be clear that after the account card 1 has been fully inserted into the bookkeeping machine, no recordings remain on the sound track. That is, as the account card passed by the pickup and recording head and the recording was properly sensed, the recording then subsequently passed by the erasing head 46 so that the recording was removed from the sound track. Accordingly, the sound track 50 is now in a position to receive the next recorded frequency.

These next recorded frequencies now must correspond to the multi-order number which appears in the new balance and which is, 1,011,937. Since the printing members 9 have printed this number last, they will have actuated their respective wipers 16 of their respective switches 13 to positions which correspond to the digit which the member 9 had printed. When the account card is emitted from the bookkeeping machine, the switch 12, which is actuated at the proper point, will then rotate so that the frequency generators 14 will each be switched in their proper order position to cause to be recorded on the sound track 50, as it passes from the machine a plurality of successive recordings which correspond to the multi-order number 1,011,937. It is apparent that these recordings are carried out in the same manner as indicated hereinabove for the recording of frequencies corresponding to the multi-order number 2,011,937.

Therefore, in accordance with the principles of the present invention, each time an account card is emitted from the bookkeeping machine it will have thereon, in addition to the various printed entries, a plurality of recordings made on a sound track thereon. The recordings on the sound track will correspond to the digits of the last balance which has been printed on the account card. Accordingly, when account card is reinserted into the bookkeeping machine for the printnig of the next entry thereon, the last balance will automatically be printed in its proper tabular column. This eliminates one key operation by the operator of the bookkeeping machine and in addition eliminates the required checking after the key operation. Accordingly, all that the operator has to do is to operate the keys corresponding to the new entry and the computing keys so that the new balance is printed. When the account card is emitted from the bookkeeping machine the recordings will be made on the sound track in accordance with the present invention and will correspond to the digits of the multi-order number which in turn corresponds to the last entered balance. In the lower left hand corner of the card 1 in Fig. 4, the numbers corresponding to the last entered balance are shown in dotted form. It is obvious that the actual numbers themselves are not entered on the sound track but only frequency recordings corresponding to the respective digits thereof.

The account card 1 has a second sound track 51 at the right hand portion thereof. The purpose of this second sound track is to adjust the vertical height of the account card when it is inserted into the machine. It is clear that as each entry is made on a line on the account card, that the account card should then be inserted so that the printed entry will be entered on the next lower line. The sound track 51 accordingly operates in combination with a second apparatus which is similar to the apparatus described in 50. However, this second apparatus merely records on the sound track 51 each time an entry is made on the line of the account card so that the sound track 51 can operate this apparatus when the account card is reinserted to properly position the account card vertically so that the printing members 9 will print their digits of the multi-order number in the proper vertical height of the column.

Figure 2:
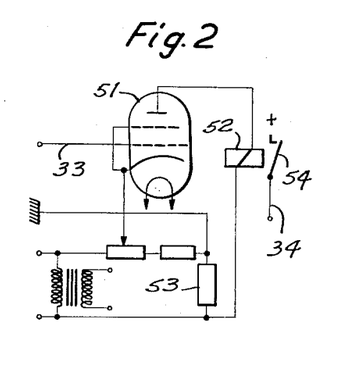
Fig. 2 is a schematic diagram of the relay circuits used in the circuit of Fig. 1.

In Fig. 2 one of the electronic relays 7 is shown. The conductor 33 which leads from the frequency tuned circuit 6a is shown connected to the control electrode of a tube 51'. The anode of the tube 51' is connected to one side of a relay winding 52, the other side of which is connected to ground by means of a resistor 53. The remaining connections in Fig. 2 deal with the supply of power to the tube 51' and for the operation of the relay 52.

When the voltage signal is transmitted through the tuned circuit 6a, this voltage signal will be applied to the conductor 33 and from there applied to the control electrode of the tube 51'. This will cause current flow in the anode circuit of the tube 51', which current will flow through the relay winding 52. This will energize relay 52 and cause the same to attract its armature 54 thereto. This will apply a source of potential (not shown) to the conductor 34 which is connected to the magnetic member 8a.

Figure 3:
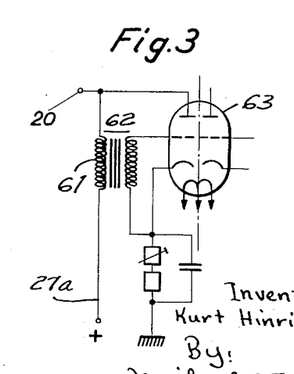
Fig. 3 is an electrical schematic diagram of one of a plurality of frequency generators used in the apparatus shown in Fig. 1.

In Fig. 3 a typical frequency generator is shown. The positive potential applied on the conductor 27a is applied to one side of a primary winding 61 of a transformer 62, the secondary winding of which is connected between the control electrode and the cathode of the twin triode 63. This will place the oscillating tube 63 into oscillation and cause to be emitted from its anode a voltage signal having a frequency corresponding to the digit 0 which would be the frequency for the frequency generator 14a. This frequency is applied on the conductor 29.

In Fig. 4 there are twelve printing members 9 shown so that a multi-order number having twelve different orders may be printed in the proper tabular column. However, there is no restriction as to the number of printing members as long as each printing member has its own switch 13 connected thereto.

The present invention can also be used with bookkeeping machines which have only one printing member 9. This is the type which has only ten keys corresponding to the digits 0-9. In such a machine the carriage is automatically shifted so that the printing member 9 will print the corresponding digit in its proper order.

In addition, several other sound tracks can be added to the account card. For example, one of the sound tracks could have recordings which correspond to the particular account number. It is clear that each of the sound tracks should advantageously have a separate pickup and recording head which senses each respective sound track. In the case of a sound track corresponding to an account number, this set of recordings can stay on the sound track relatively permanently.

It is also clear that it is not necessary that the characters printed on the card be digits but rather that they can be any type of characters such as letters, for example. In addition these characters do not have to be printed but merely marked in some manner on the account card. For example, they may be punched out of the account card in some way.

The embodiment illustrated for the present invention indicated that the differences between the recordings for the different digits deal with different frequencies. That is, a particular frequency corresponds to a particular digit. However, it is also clear that some other characteristics of the recording or voltage signal making the recording can be used. For example, each digit can be recorded in such a manner that the voltage signal has a different amplitude for each digit. In that way the voltage signal might have the same frequency but each converted voltage signal would have a different amplitude, each amplitude corresponding to a different digit. In this embodiment instead of using frequency tuned circuits some type of pulse height selector could be used to bring about the proper operation.

It will be understood that each of the elements described above, or two or more together, may also find a useful application in other types of recording apparatus different from the types described above.

While the invention has been illustrated and described as embodied in a bookkeeping machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a bookkeeping machine using cards having soundtrack record carrier means adapted to have recordings thereon corresponding to different characters, in combination, pickup means for successively sensing recordings on the soundtrack record carrier means of the card and for producing signals having predetermined characteristics associated with the respective sensed recordings; marking means having a plurality of said characters thereon and being movable between a plurality of positions, said marking means being adapted to mark on the card, in each of said positions one of said different characters corresponding to one of the characters represented by a recording on said soundtrack record carrier means; means connected to said pickup means and being selectively responsive to signals produced by the same; and operating means controlled by said selectively responsive means and connected to said marking means for moving the same between its positions in accordance with the predetermined characteristics of the respective signals whereby a character is marked on said card corresponding to the character represented by the recording on the soundtrack record carrier means sensed by said pickup means.

2. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording;

marking means having a plurality of said digits thereon and being movable between a plurality of positions, said marking means being adapted to mark on the card in each of said positions one of said different digits corresponding to one of said digits represented by a recording on said soundtrack record carrier means; means connected to said pickup means and being selectively responsive to voltage signals produced by the same; and operating means controlled by said selectively responsive means and connected to said marking means for moving the same between its positions in accordance with the predetermined frequencies of the respective voltage signals whereby a digit is marked on said card corresponding to the digit represented by the recording on the soundtrack record carrier means sensed by said pickup means.

3. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; a plurality of selectively responsive means connected to said pickup means, each of said selectively responsive means being respectively responsive to voltage signals having a different one of said predetermined characteristics; and operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means.

4. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; and means for erasing said recordings on said soundtrack record carrier means after they have been sensed by said pickup means so that new recordings may be made on said record carrier means whenever desired.

5. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording; marking means having a plurality of said digits thereon and being movable between a plurality of positions, said marking means being adapted to mark on the card in each of said positions one of said different digits corresponding to one of said digits represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined frequencies of the respective voltage signals whereby a digit is marked on said card corresponding to the digit represented by the recording on the soundtrack record carrier means sensed by said pickup means; and means for erasing said recordings on said soundtrack record carrier means after they have been sensed by said pickup means so that new recordings may be made on said record carrier means whenever desired.

6. In a bookkeeping machine using cards having soundtrack record carrier means adapted to have recordings thereon corresponding to different characters, in combination, pickup means for successively sensing each recording on the soundtrack record carrier means of the card as the card is inserted in the bookkeeping machine and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; means for erasing said recordings on said soundtrack record carrier means after they have been sensed by said pickup means; and means for subsequently recording on said soundtrack record carrier means of said card characteristic recordings respectively associated with characters marked on said card by said marking means.

7. In a bookkeeping machine using cards having soundtrack record carrier means adapted to have recordings thereon corresponding to different characters, in combination, pickup means for successively sensing each recording on the soundtrack record carrier means of the card as the card is inserted in the bookkeeping machine and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the record carrier means sensed by said pickup means; means for erasing said recordings on said soundtrack record carrier means after they have been sensed by said pickup means; and means for subsequently recording on said soundtrack record carrier means of said card as said card is removed from said bookkeeping machine characteristic recordings respectively associated with the last set of characters marked on said card by said marking means.

8. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; printing means having a plurality of said characters thereon and being movable between a plurality of positions, said printing means being adapted to print on the card in each of said positions one of said different characters corresponding to one of the characters represented by a recording on said soundtrack record carrier means; means connected to said pickup means and being selectively responsive to voltage signals produced by the same; and operating means controlled by said selectively responsive means and connected to said printing means for moving the same between its positions in accordance with the predetermined characteristics of the respective voltage signals whereby a character is printed on said card corresponding to the character represented by the recording on the soundtrack record carrier means sensed by said pickup means.

9. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; and a second soundtrack record carrier means located on said card and adapted to have recorded thereon additional recordings corresponding to a desired position of the card in said bookkeeping machine.

10. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording; marking means having a plurality of said characters thereon and being movable between a plurality of positions, said marking means being adapted to mark on the card in each of said positions one of said different digits corresponding to one of said digits represented by a recording on said soundtrack record carrier means; an amplifier for amplifying said voltage signals; a plurality of selectively responsive circuits connected to said amplifier, each of said circuits being respectively tuned to a different one of said predetermined frequencies; and operating means controlled by said selectively responsive circuits and connected to said marking means for moving the same between its positions in accordance with the predetermined frequencies of the respective voltage signals whereby a digit is marked on said card corresponding to the digit represented by the recording on the soundtrack record carrier means sensed by said pickup means.

11. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording; marking means having a plurality of said characters thereon and being movable between a plurality of positions, said marking means being adapted to mark on the card in each of said positions one of said different digits corresponding to one of said digits represented by a recording on said soundtrack record carrier means; an amplifier for amplifying said voltage signals; a plurality of selectively responsive circuits connected to said amplifier, each of said circuits being respectively tuned to a different one of said predetermined frequencies and permitting the transmission therethrough of voltage signals having only one of said predetermined frequencies; a plurality of relay means, each of said relay means being respectively associated with one of said selectively responsive circuits and being responsive to the voltage signal transmitted through its respective circuit; and operating means controlled by said selectively responsive circuits and connected to said marking means for moving the same between its positions in accordance with the predetermined frequencies of the respective voltage signals whereby a digit is marked on said card corresponding to the digit represented by the recording on the soundtrack record carrier means sensed by said pickup means.

12. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; means for erasing said recordings on said soundtrack record carrier means after they have been sensed by said pickup means; first switching means connected to said marking means and movable therewith, said first switching means being operable between a plurality of positions corresponding respectively to a different one of said different characters; recording means connected to said first switching means for recording on said soundtrack characteristic recordings respectively associated with said different characters; and second switching means connected to said first switching means for operating said recording means to cause the same to record on said soundtrack record carrier means recordings corresponding to the respective characters marked by said marking means.

13. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; means for erasing said recordings on said soundtrack record carrier means after they have been sensed by said pickup means; first switching means connected to said marking means and movable therewith, said first switching means being operable between a plurality of positions corresponding respectively to a different one of said different characters; a plurality of frequnecy generators connected to said first switching means, each of said frequency generators being respectively connected to said first switching means in a different one of its plurality of positions and for generating a respective frequency corresponding respectively to a different one of said characters; recording means connected to said frequency generators for recording on said soundtrack record carrier means characteristic frequencies respectively associated with said different characters; and second switching means connected to said first switching means for operating said frequency generators and said recording means to cause the same to record on said soundtrack record carrier means frequencies corresponding to the respective characters marked by said marking means.

14. In a bookkeeping machine using cards having soundtrack record carrier means adapted to have recordings thereon corresponding to different characters, in combination, pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined characteristics of the respective voltage signals whereby a character is marked on said card corresponding to the character represented by the recording on the soundtrack record carrier means sensed by said pickup means; means for erasing said recordings on said soundtrack record carrier means after they have been sensed by said pickup means; first switching means connected to said marking means and movable therewith, said first switching means being operable between a plurality of positions corresponding respectively to a different one of said different characters; recording means connected to said first switching means for recording on said soundtrack record carrier means characteristic recordings respectively associated with said different characters; and second switching means operated as said card is removed from said bookkeeping machine and connected to said first switching means for operating said recording means to cause the same to record on said soundtrack record carrier means recordings corresponding to the last set of characters marked by said marking means.

15. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording; marking means having a plurality of said digits thereon and being movable between a plurality of positions, said marking means being adapted to mark on the card in each of said positions one of said different digits corresponding to one of said digits represented by a recording on said soundtrack record carrier means; means connected to said pickup means and being selectively responsive to voltage signals produced by the same; operating means controlled by said selectively responsive means and connected to said marking means for moving the same between its positions in accordance with the predetermined frequencies of the respective voltage signals whereby a digit is marked on said card corresponding to the digit represented by the recording on the soundtrack record carrier means sensed by said pickup means; means for erasing said recordings on said soundtrack record carrier means after they have been sensed by said pickup means; first switching means connected to said marking means and movable therewith, said first switching means being operable between a plurality of positions corresponding respectively to a different one of said different digits; recording means connected to said first switching means for recording on said soundtrack record carrier means characteristic recordings respectively associated with said different digits; and second switching means connected to said first switching means for operating said recording means to cause the same to record on said soundtrack record carrier means recordings corresponding to the respective digits marked by said marking means.

16. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording; marking means having a plurality of said digits thereon and being movable between a plurality of positions, said marking means being adapted to mark on the card in each of said positions one of said different digits corresponding to one of said digits represented by a recording on said soundtrack record carrier means; an amplifier for amplifying said voltage signals; a plurality of selectively responsive circuits connected to said amplifier, each of said circuits being respectively tuned to a different one of said predetermined frequencies and permitting the transmission therethrough of voltage signals having only one of said predetermined frequencies; a plurality of relay means, each of said relay means being respectively associated with one of said selectively responsive circuits and being responsive to the voltage signal transmitted through its respective circuit; a plurality of magnetic means, each of said magnetic means being respectively connected to one of said plurality of relay means; and operating means controlled by said magnetic means and connected to said marking means for moving the same between its positions in accordance with the predetermined frequencies of the respective voltage signals whereby a digit is marked on said card corresponding to the digit represented by the recording on the soundtrack record marking means sensed by said pickup means.

17. In a bookkeeping machine using cards having soundtrack record carrier means adapted to have recordings thereon corresponding to different digits, in combination, pickup means for successively sensing each recording on the soundtrack record carrier means of the card and for producing a voltage signal having a predetermined frequency associated with the respective sensed recording; printing means having a plurality of said digit means movable between a plurality of positions, said printing means being adapted to print on the card in each of said positions one of said different digits corresponding to one of said digits represented by a recording on said soundtrack record carrier means; means connected to said pickup means and being selectively responsive to voltage signals produced by the same; and operating means controlled by said selectively responsive means and connected to said printing means for moving the same between its positions in accordance with the predetermined frequencies of the respective voltage signals whereby a digit is printed on said card corresponding to the digit represented by the recording on the soundtrack record carrier means sensed by said pickup means.

18. In a bookkeeping machine using cards having soundtrack record carrier means adapted to have recordings thereon corresponding to different characters, in combination, magnetic pickup means for successively sensing each recording on the soundtrack record carrier means of the card and for producing a voltage signal having a predetermined characteristic associated with the respective sensed recording; marking means having a plurality of said characters thereon and being movable between a plurality of positions, said marking means being adapted to mark on the card in each of said positions one of said different characters corresponding to one of the characters represented by a recording on said soundtrack record carrier means; means connected to said magnetic pickup means and being selectively responsive to voltage signals produced by the same; and operating means controlled by said selectively responsive means and connected to said marking means for moving the same between its positions in accordance with the predetermined characteristics of the respective voltage signals whereby a character is marked on said card corresponding to the character represented by the magnetic recording on the soundtrack record carrier means sensed by said magnetic pickup means.

19. In a bookkeeping machine using cards having at least one soundtrack portion adapted to have recordings thereon corresponding to different characters, in combination, means for sensing recordings on the soundtrack portion of the cards and for producing signals having preselected characteristics associated with the sensed recordings; marking means having a plurality of character representing means thereon respectively associated with different characters for marking said different characters on said card, each of said different characters corresponding to one of said characters represented by recordings on said soundtrack; signal responsive means connected to said sensing means and being responsive to signals produced by the same; and operating means controlled by said signal responsive means for selectively actuating said character representing means in accordance with the preselected characteristics of the signals produced by said sensing means whereby a character is marked on said card corresponding to the character represented by the recording on the soundtrack portion sensed by said sensing means.

20. In a bookkeeping machine using cards having at least one soundtrack portion adapted to have recordings thereon corresponding to different characters, in combination, means for sensing recordings on the soundtrack portion of the cards and for producing signals having preselected characteristics associated with the sensed recordings; marking means having a plurality of character representing means thereon respectively associated with different characters for marking said different characters on said card, each of said different characters corresponding to one of said characters represented by recordings on said soundtrack; signal responsive means connected to said sensing means and being responsive to signals produced by the same; operating means controlled by said signal responsive means for selectively actuating said character representing means in accordance with the preselected characteristics of the signals produced by said sensing means whereby a character is marked on said card corresponding to the character represented by the recording on the soundtrack portion sensed by said sensing means.

References Cited in the file of this patent

UNITED STATES PATENTS

| | | |
|---|---|---|
| 1,608,837 | Bryce | Nov. 30, 1926 |
| 2,258,106 | Bryce | Oct. 7, 1941 |
| 2,278,118 | Pitman | Mar. 31, 1942 |
| 2,566,972 | Wheeler | Sept. 4, 1951 |
| 2,638,842 | Stuivenberg | May 19, 1953 |
| 2,640,647 | Rand | June 2, 1953 |
| 2,650,024 | Ferrin | Aug. 25, 1953 |

Notice of Adverse Decision in Interference

In Interference No. 91,053 involving Patent No. 2,838,993, K. Hinrichs, Selective printer responsive to sound track on record card, final judgment adverse to the patentee was rendered June 30, 1964, as to claim 9.
[*Official Gazette November 24, 1964.*]